(12) United States Patent
Pease et al.

(10) Patent No.: US 8,477,479 B2
(45) Date of Patent: Jul. 2, 2013

(54) LEADWIRE CONFIGURATION FOR A PLANAR ANODE OF A WET ELECTROLYTIC CAPACITOR

(75) Inventors: Robert Hazen Pease, North Berwick, ME (US); James Steven Bates, Saco, ME (US)

(73) Assignee: AVX Corporation, Fountain Inn, SC (US)

( * ) Notice: Subject to any disclaimer, the term of this patent is extended or adjusted under 35 U.S.C. 154(b) by 218 days.

(21) Appl. No.: 13/005,120

(22) Filed: Jan. 12, 2011

(65) Prior Publication Data

US 2012/0176729 A1    Jul. 12, 2012

(51) Int. Cl.
*H01G 9/04* (2006.01)
*H01G 9/00* (2006.01)

(52) U.S. Cl.
USPC ............................ 361/508; 361/528; 29/25.03

(58) Field of Classification Search
USPC .......... 361/528, 540, 520, 508–509; 29/25.03
See application file for complete search history.

(56) References Cited

U.S. PATENT DOCUMENTS

| | | |
|---|---|---|
| 5,211,741 A | 5/1993 | Fife |
| 5,369,547 A | 11/1994 | Evan |
| 5,580,367 A | 12/1996 | Fife |
| 5,729,428 A | 3/1998 | Sakata et al. |
| 5,808,857 A | 9/1998 | Stevens |
| 5,922,215 A | 7/1999 | Pless et al. |
| 5,926,362 A | 7/1999 | Muffoletto et al. |
| 5,954,856 A | 9/1999 | Pathare et al. |
| 5,968,210 A | 10/1999 | Strange et al. |
| 6,110,622 A | 8/2000 | Frysz et al. |
| 6,238,456 B1 | 5/2001 | Wolf et al. |
| 6,421,226 B1 | 7/2002 | O'Phelan et al. |
| 6,426,864 B1 | 7/2002 | O'Phelan et al. |
| 6,461,771 B1 | 10/2002 | Frysz et al. |
| 6,556,863 B1 | 4/2003 | O'Phelan et al. |
| 6,594,140 B1 | 7/2003 | Evans et al. |
| 6,659,283 B1 | 12/2003 | Muffoletto et al. |

(Continued)

FOREIGN PATENT DOCUMENTS

| | | | |
|---|---|---|---|
| JP | 05283297 A | * | 10/1993 |
| JP | 05283298 A | * | 10/1993 |

(Continued)

OTHER PUBLICATIONS

Related U.S. Patent Application Form.

(Continued)

*Primary Examiner* — Eric Thomas
(74) *Attorney, Agent, or Firm* — Dority & Manning, P.A.

(57) ABSTRACT

A relatively thin planar anode for use in a wet electrolytic capacitor is provided. An anode leadwire is embedded within the anode and extends in a longitudinal direction therefrom. The wire may be formed from any electrically conductive material, such as tantalum, niobium, aluminum, hafnium, titanium, etc., as well as electrically conductive oxides and/or nitrides of thereof. To reduce the tendency of the leadwire to pull out of the anode due to stresses encountered during manufacturing (e.g., sintering) and/or use of the capacitor, the manner in which the wire is inserted is selectively controlled in the present invention. That is, at least a portion of the wire within the anode is bent at an angle relative to the longitudinal axis of the wire. This "bend" reduces the ease to which the wire can be pulled out in the longitudinal direction after the anode is pressed and sintered.

27 Claims, 6 Drawing Sheets

U.S. PATENT DOCUMENTS

| | | |
|---|---|---|
| 6,727,022 B2 | 4/2004 | Gan et al. |
| 6,801,424 B1 | 10/2004 | Nielsen et al. |
| 6,807,048 B1 * | 10/2004 | Nielsen et al. ............... 361/520 |
| 6,819,544 B1 | 11/2004 | Nielsen et al. |
| 6,850,405 B1 | 2/2005 | Mileham et al. |
| 6,858,126 B1 | 2/2005 | Hemphill et al. |
| 6,965,510 B1 | 11/2005 | Liu et al. |
| 7,002,790 B2 | 2/2006 | Hossick-Schott et al. |
| 7,012,799 B2 | 3/2006 | Muffoletto et al. |
| 7,043,300 B2 | 5/2006 | O'Phelan et al. |
| 7,099,143 B1 | 8/2006 | Fife et al. |
| 7,142,408 B2 | 11/2006 | Wang |
| 7,169,284 B1 | 1/2007 | Jiang et al. |
| 7,224,576 B2 | 5/2007 | Hossick-Schott |
| 7,256,982 B2 | 8/2007 | Lessner et al. |
| 7,342,774 B2 | 3/2008 | Hossick-Schott et al. |
| 7,445,646 B1 | 11/2008 | Strange et al. |
| 7,483,260 B2 | 1/2009 | Ziarniak et al. |
| 7,499,260 B2 | 3/2009 | Schott et al. |
| 7,515,396 B2 | 4/2009 | Biler |
| 7,555,339 B2 | 6/2009 | Nielsen et al. |
| 7,558,051 B2 | 7/2009 | O'Phelan et al. |
| 7,666,247 B2 | 2/2010 | He et al. |
| 7,667,954 B2 | 2/2010 | Lessner et al. |
| 7,684,171 B2 | 3/2010 | Rorvick et al. |
| 7,731,893 B2 | 6/2010 | Freeman et al. |
| 7,813,107 B1 | 10/2010 | Druding et al. |
| 7,837,743 B2 | 11/2010 | Gaffney et al. |
| 7,879,217 B2 | 2/2011 | Goad et al. |
| 7,983,022 B2 | 7/2011 | O'Connor et al. |
| 2003/0141193 A1 * | 7/2003 | Hossick-Schott ............ 205/104 |
| 2004/0243183 A1 | 12/2004 | Norton et al. |
| 2008/0232029 A1 * | 9/2008 | Ning ............................ 361/503 |
| 2009/0103243 A1 | 4/2009 | Mizukoshi et al. |
| 2009/0117457 A1 | 5/2009 | Davis et al. |
| 2009/0273885 A1 | 11/2009 | Jiang et al. |
| 2010/0142124 A1 | 6/2010 | Dreissig et al. |
| 2010/0326967 A1 | 12/2010 | Freitag et al. |

FOREIGN PATENT DOCUMENTS

| | | |
|---|---|---|
| JP | 2005033097 A | 2/2005 |
| JP | 2006024607 A * | 1/2006 |
| WO | WO 9303191 A1 | 2/1993 |
| WO | WO 2006105766 A1 | 10/2006 |
| WO | WO 2007089982 A1 | 8/2007 |

OTHER PUBLICATIONS

Search Report for GB1122266.8 dated Apr. 25, 2012, 4 pages.

* cited by examiner

US 8,477,479 B2

LEADWIRE CONFIGURATION FOR A PLANAR ANODE OF A WET ELECTROLYTIC CAPACITOR

BACKGROUND OF THE INVENTION

High voltage electrolytic capacitors are employed as energy storage reservoirs in many applications, including implantable medical devices. These capacitors are required to have a high energy density because it is desirable to minimize the overall size of the implanted device. This is particularly true of an implantable cardioverter defibrillator ("ICD"), also referred to as an implantable defibrillator, because the high voltage capacitors used to deliver the defibrillation pulse can occupy as much as one third of the ICD volume. ICDs typically use two electrolytic capacitors in series to achieve the desired high voltage for shock delivery.

One strategy for increasing energy density in the capacitor, and thus reducing its size, is to minimize the volume taken up by the paper and cathode and maximize the number of anodes. This may be achieved by using a multi-anode stack configuration. A multiple anode stack configuration requires fewer cathodes and paper spacers than a single anode configuration and thus reduces the size of the device. A multiple anode stack includes a number of units that contain a cathode, a paper spacer, two or more anodes, a paper spacer and a cathode, with neighboring units sharing the cathode between them. However, to charge and discharge the inner anodes (furthest from the cathode), charge must flow through the outer anodes. With a typical anode, the path through an anode is quite tortuous and results in a high equivalent series resistance ("ESR") for the multi-anode configuration. Thus, ESR increases as more anodes are placed together in the stack. Another strategy for decreasing the size of the device is to increase the operating voltage of the capacitor, which may potentially allow for the use of only one electrolytic capacitor. The unique challenge of increasing the operating voltage of the capacitor, however, is that high voltage is usually correlated with a low surface area, which reduces capacitance and likewise energy ($E=0.5*CV^2$).

Regardless of the particular strategy employed, metal foils (e.g., aluminum foil) have often been employed in the electrolytic capacitor due to their small size. Because the electrostatic capacitance of the capacitor is proportional to its electrode area, the surface of the metallic foil may be, prior to the formation of the dielectric film, roughened or subjected to a chemical conversion to increase its effective area. This step of roughening the surface of the metallic foil is called etching. Etching is normally carried out either by the method (chemical etching) of conducting immersion into a solution of hydrochloric acid or by the method (electrochemical etching) of carrying out electrolysis in an aqueous solution of hydrochloric acid. The capacitance of the electrolytic capacitor is determined by the extent of roughing (the surface area) of the anode foil and the thickness and the dielectric constant of the oxide film.

Due to the limited surface area that may be provided by etching metallic foils, attempts have also been made to employ a powder-formed pellet in wet electrolytic capacitors. Such pellets generally contain a leadwire for connecting to an anode termination of the capacitor. Unfortunately, the wire itself is often responsible for mechanical weaknesses and poor electrical performance of the resulting capacitor. For example, the anode is sometimes processed or maneuvered by welding the free end of the leadwire onto a metal strip. While this minimizes unnecessary contact with the anode body, the gravitational force imparted by hanging can nevertheless cause the wire to pull out of the anode. Even if the wire is not completely pulled out, such hanging can still result in poor wire-to-anode contact, which can adversely impact electrical performance.

As such, a need currently exists for an improved electrolytic capacitor for use in implantable medical devices, such as defibrillators.

SUMMARY OF THE INVENTION

In accordance with one embodiment of the present invention, a planar anode for use in a wet electrolytic capacitor is disclosed. The anode comprises an anodically oxidized pellet formed from a pressed and sintered powder. The anode further comprises a leadwire that contains a first portion extending outwardly from the pellet in a longitudinal direction and a second portion that is embedded within the pellet, wherein the second portion is oriented at an angle of about 40° to about 120° relative to the longitudinal direction. The planar anode has a thickness of about 5 millimeters or less, and the ratio of the length of the anode to the thickness of the anode is from about 5 to about 50.

In accordance with another embodiment of the present invention, a method for forming a planar anode for use in a wet electrolytic capacitor is disclosed. The method comprises pressing a valve metal powder around a leadwire and sintering the pressed powder to form a pellet, wherein a first portion of the leadwire extends outwardly from the pellet in a longitudinal direction and a second portion of the leadwire is embedded within the pellet. The second portion is oriented at an angle of about 40° to about 120° relative to the longitudinal direction. The pellet is anodically oxidized to form a dielectric layer, wherein the anodically oxidized pellet has a thickness of about 5 millimeters or less.

In accordance with yet another embodiment of the present invention, a wet electrolytic capacitor is disclosed that comprises a planar anode, a cathode that comprises a metal substrate coated with an electrochemically active material, and an electrolyte in communication with the anode and the cathode. The planar anode comprises an anodically oxidized pellet formed from a pressed and sintered powder. The anode further comprises a leadwire that contains a first portion extending outwardly from the pellet in a longitudinal direction and a second portion that is embedded within the pellet. The second portion is oriented at an angle of about 40° to about 120° relative to the longitudinal direction.

Other features and aspects of the present invention are set forth in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figures in which.

5A illustrates the press mold prior to compaction

Figure 1:
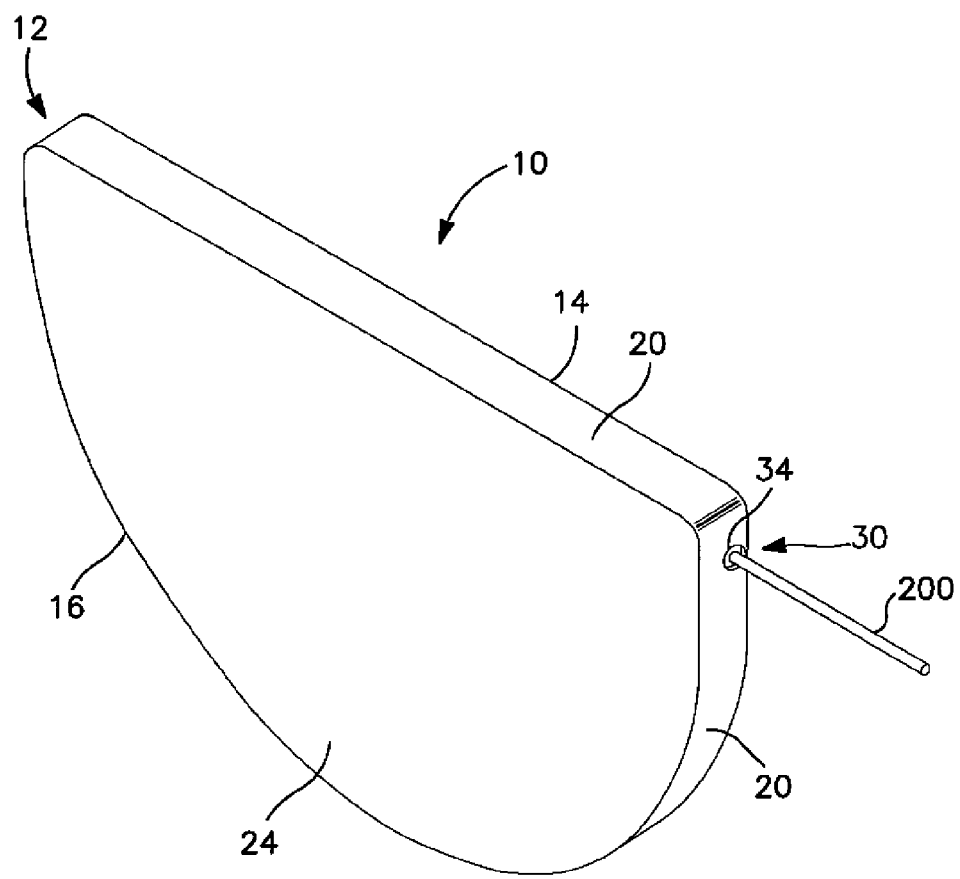
FIG. 1 is a perspective view of one embodiment of the wet electrolytic capacitor of the present invention.

Repeat use of reference characters in the present specification and drawings is intended to represent same or analogous features or elements of the invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention, which broader aspects are embodied in the exemplary construction.

Generally speaking, the present invention is directed to a relatively thin planar anode for use in a wet electrolytic capacitor. An anode leadwire is embedded within the anode and extends in a longitudinal direction therefrom. The wire may be formed from any electrically conductive material, such as tantalum, niobium, aluminum, hafnium, titanium, etc., as well as electrically conductive oxides and/or nitrides of thereof. To reduce the tendency of the leadwire to pull out of the anode due to stresses encountered during manufacturing (e.g., sintering) and/or use of the capacitor, the manner in which the wire is inserted is selectively controlled in the present invention. That is, at least a portion of the wire within the anode is bent at an angle relative to the longitudinal axis of the wire. This "bend" reduces the ease to which the wire can be pulled out in the longitudinal direction after the anode is pressed and sintered.

Various embodiments of the present invention will now be described in more detail.

I. Anode

The anode is typically formed from a valve metal composition. The specific charge of the composition may vary, such as from about 2,000 $\mu F^*V/g$ to about 80,000 $\mu F^*V/g$, in some embodiments from about 5,000 $\mu F^*V/g$ to about 40,000 $\mu F^*V/g$ or more, and in some embodiments, from about 10,000 to about 20,000 $\mu F^*V/g$. The valve metal composition contains a valve metal (i.e., metal that is capable of oxidation) or valve metal-based compound, such as tantalum, niobium, aluminum, hafnium, titanium, alloys thereof, oxides thereof, nitrides thereof, and so forth. For example, the valve metal composition may contain an electrically conductive oxide of niobium, such as niobium oxide having an atomic ratio of niobium to oxygen of 1:1.0±1.0, in some embodiments 1:1.0±0.3, in some embodiments 1:1.0±0.1, and in some embodiments, 1:1.0±0.05. The niobium oxide may be $NbO_{0.7}$, $NbO_{1.0}$, $NbO_{1.1}$, and $NbO_2$. Examples of such valve metal oxides are described in U.S. Pat. No. 6,322,912 to Fife; U.S. Pat. No. 6,391,275 to Fife et al.; U.S. Pat. No. 6,416,730 to Fife et al.; U.S. Pat. No. 6,527,937 to Fife; U.S. Pat. No. 6,576,099 to Kimmel, et al.; U.S. Pat. No. 6,592,740 to Fife, et al.; and U.S. Pat. No. 6,639,787 to Kimmel, et al.; and U.S. Pat. No. 7,220,397 to Kimmel, et al., as well as U.S. Patent Application Publication Nos. 2005/0019581 to Schnitter; 2005/0103638 to Schnitter, et al.; 2005/0013765 to Thomas, et al., all of which are incorporated herein in their entirety by reference thereto for all purposes.

To form the anode, a powder of the valve metal composition is generally employed. The powder may contain particles any of a variety of shapes, such as nodular, angular, flake, etc., as well as mixtures thereof. Particularly suitable powders are tantalum powders available from Cabot Corp. (e.g., C255 flake powder, TU4D flake/nodular powder, etc.) and H. C. Starck (e.g., NH175 nodular powder). Although not required, the powder may be agglomerated using any technique known in the art, such as through heat treatment. Prior to forming the powder into the shape of an anode, it may also be optionally mixed with a binder and/or lubricant to ensure that the particles adequately adhere to each other when pressed to form the anode body. The resulting powder may then be compacted to form a pellet using any conventional powder press device. For example, a press mold may be employed that is a single station compaction press containing a die and one or multiple punches. Alternatively, anvil-type compaction press molds may be used that use only a die and single lower punch. Single station compaction press molds are available in several basic types, such as cam, toggle/knuckle and eccentric/crank presses with varying capabilities, such as single action, double action, floating die, movable platen, opposed ram, screw, impact, hot pressing, coining or sizing.

Figure 5A:
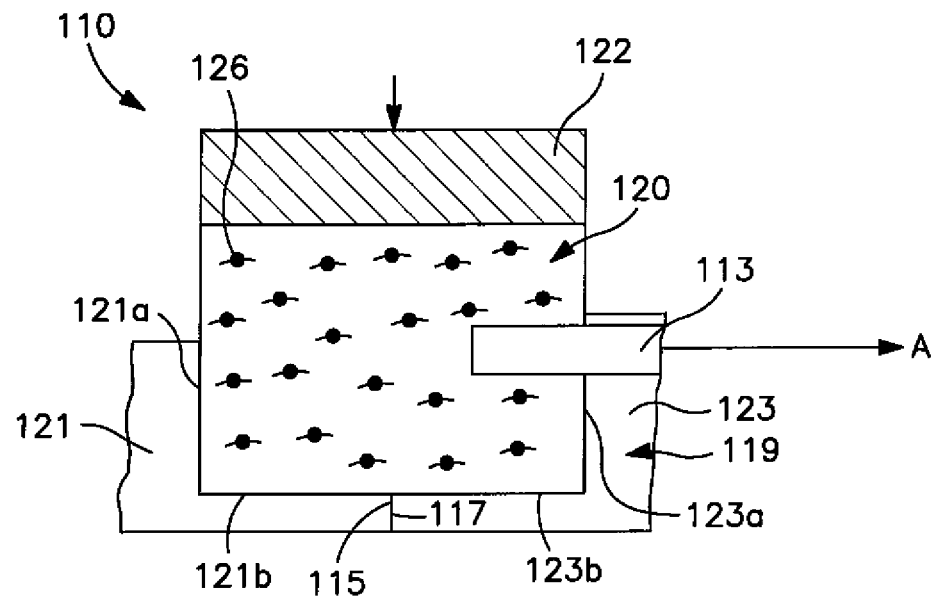
FIG. 5 is a schematic illustration of one embodiment for pressing a flake tantalum powder into a pellet, in which FIG.
FIG. 5B illustrates the press mold after compaction.

Regardless of its particular composition, the powder is compacted around the anode leadwire of the present invention so that at least a portion of the wire is "bent" within the anode. As emphasized above, this minimizes the likelihood that the wire may pull out of the anode, either during manufacturing or use of the capacitor. Referring to FIG. 5, for example, one exemplary embodiment for compacting powder into the shape of a planar anode using a press mold 110 will now be described in more detail. In this particular embodiment, the press mold 110 includes a die 119 having a first die portion 121 and a second die portion 123. Of course, the die 119 may also be formed from a single part instead of multiple portions. Nevertheless, in FIG. 5, the first die portion 121 defines inner walls 121*a* and 121*b*, and the second die portion defines inner walls 123*a* and 123*b*. The walls 121*a* and 123*a* are substantially perpendicular to the walls 121*b* and 123*b*, respectively. The first and second die portions 121 and 123 also define opposing surfaces 115 and 117. During use, the surfaces 115 and 117 are placed adjacent to each other so that the walls 121*b* and 123*b* are substantially aligned to form a die cavity 120 having a planar D-shaped configuration. It will be appreciated that while a single die cavity is schematically shown in FIG. 5, multiple die cavities may be employed. As shown in FIG. 5A, a certain quantity of powder 126 is loaded into the die cavity 120 and an anode wire 113 is embedded therein. Although shown in this embodiment as having a cylindrical shape, it should be understood that any other shape may also be utilized for the anode wire 113. Further, the anode wire 113 may also be attached (e.g., welded) to the anode subsequent to pressing and/or sintering.

Figure 5B:
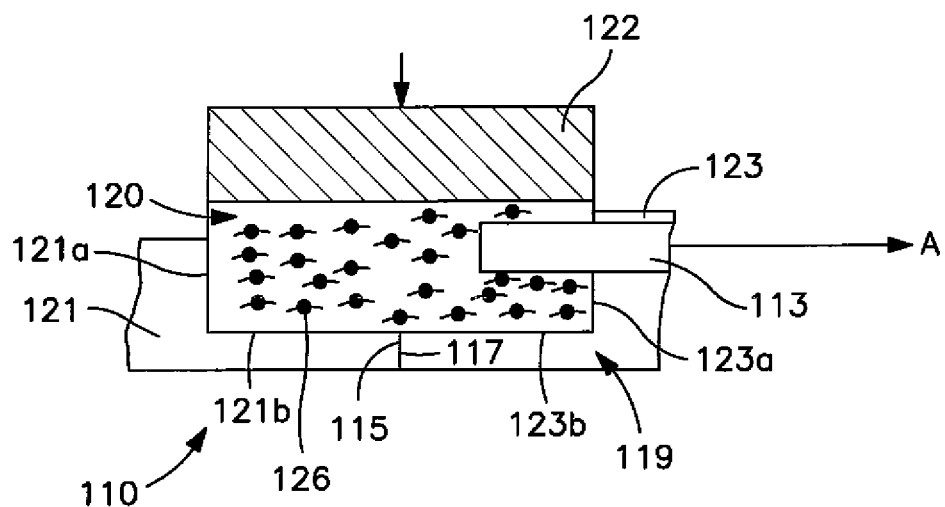

After filling, the die cavity 120 is closed from as shown in FIG. 5B by an upper punch 122. It should be understood that additional punches (e.g., a lower punch) may also be utilized. The direction in which the compressive forces are exerted may provide improved properties to the resulting capacitor. For example, as illustrated by the directional arrows in FIG. 5B, the force exerted by the punch 122 is in a direction that is substantially "perpendicular" to a longitudinal axis "A" of the wire 113. That is, the force is typically exerted at an angle of from about 60° to about 120°, and preferably about 90° relative to the axis "A." In this manner, the wire 113 is embedded into the powder 126 so that it may slip into the space between adjacent flakes. The perpendicular pressing technique described above causes the pellet to contain particles (e.g., flakes) generally oriented in the direction of the longitudinal axis of the wire 113 (See also, the "y" direction in FIG. 3). This forces the particles into close contact with the wire and creates a strong wire-to-powder bond.

Any binder/lubricant may be removed after pressing by heating the pellet under vacuum at a certain temperature (e.g., from about 150° C. to about 500° C.) for several minutes. Alternatively, the binder/lubricant may also be removed by contacting the pellet with an aqueous solution, such as described in U.S. Pat. No. 6,197,252 to Bishop, et al., which is incorporated herein in its entirety by reference thereto for all purposes. Thereafter, the pellet is sintered to form a porous, integral mass. The present inventors have discovered that certain sintering conditions can result in an increase in the specific charge of the resulting anode, as well increase in the breakdown voltage of the resulting capacitor. More particularly, the pellet is typically sintered at a temperature of from about 1300° C. to about 2000° C., in some embodiments from about 1400° C. to about 1800° C., and in some embodiments, from about 1500° C. to about 1700° C., for a time of from about 5 minutes to about 100 minutes, and in some embodiments, from about 30 minutes to about 60 minutes. If desired, sintering may occur in an atmosphere that limits the transfer of oxygen atoms to the anode. For example, sintering may occur in a reducing atmosphere, such as in a vacuum, inert gas, hydrogen, etc. The reducing atmosphere may be at a pressure of from about 10 Torr to about 2000 Torr, in some embodiments from about 100 Torr to about 1000 Torr, and in some embodiments, from about 100 Torr to about 930 Torr. Mixtures of hydrogen and other gases (e.g., argon or nitrogen) may also be employed. When employed, flake particles may be better able to withstand the high sintering temperatures and prolonged sintering times often employed in forming the anode, and produce a porous sintered body with low shrinkage and a large specific surface area.

Figure 2:
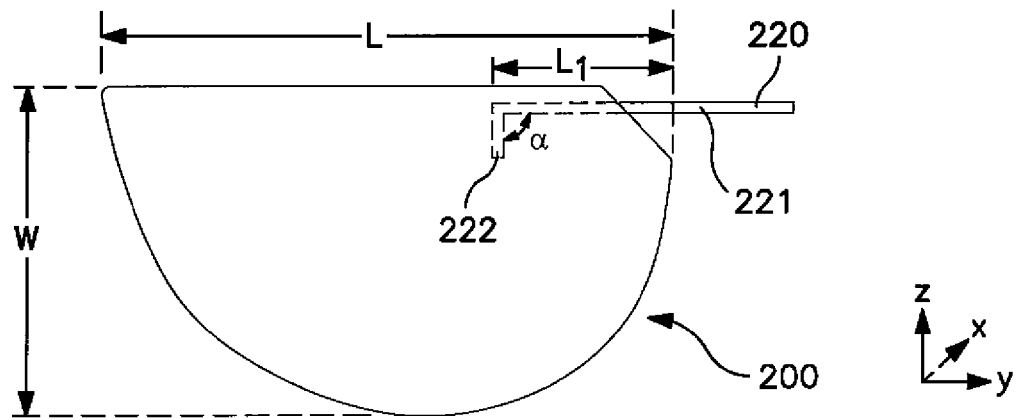
FIG. 2 is a top view of embodiment of an anode that may be employed in the capacitor of the present invention.
Figure 3:
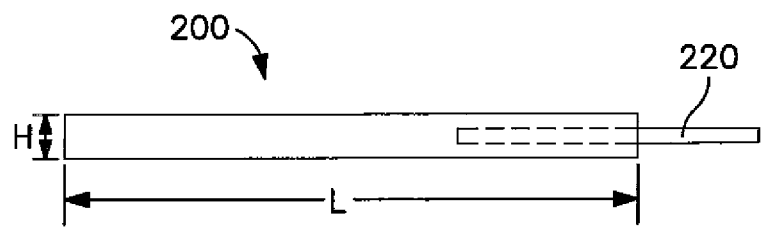
FIG. 3 is a frontal view of the anode of FIG. 2.

One embodiment of the resulting sintered, planar anode is depicted in FIGS. 2-3. As illustrated, an anode wire 220 is embedded within the anode 200 and contains a first portion 221 that extends in a longitudinal direction ("y" direction) from the anode 200. Within the body of the anode, the wire 200 also contains a second portion 222 that is bent at an angle "α" relative to the first portion 221. The angle "α" is typically from about 40° to about 120°, in some embodiments from about 60° to about 110°, and in some embodiments, from about 80° to about 100° (e.g., about 90°). Such a bent configuration may be achieved in a variety of different ways. For example, in one embodiment, a press mold may be partially filled with the flake powder, and then a "pre-bent" anode wire may be inserted into the press mold. Thereafter, the mold may be filled with powder and the entire assembly compressed into a pellet.

In addition to its geometric configuration, the extent to which the anode wire is inserted into the anode may also be controlled to help minimize the likelihood of withdrawal during manufacturing. That is, the wire is less likely to be pulled out of the anode the farther it is inserted. Of course, too great of a wire insertion can alter the uniformity of the press density, which can impact the resulting electrical performance of the anode. In this regard, the present inventors have discovered that the ratio of the length of the anode in which the wire is inserted to the entire length of the anode is typically from about 0.1 to about 0.6, and in some embodiments, from about 0.2 to about 0.5. In FIG. 2, for example, the length "$L_1$" represents the length of the anode 200 in which the anode wire 220 is inserted (i.e., the length of the second portion 222), while the length "L" represents the entire length of the anode 200. In certain cases, the length "L" of the anode 200 may range from about 1 to about 80 millimeters, in some embodiments from about 10 to about 60 millimeters, and in some embodiments, from about 20 to about 50 millimeters. Likewise, the length "$L_1$" may be from about 1 to about 40 millimeters, in some embodiments, from about 2 to about 20 millimeters, and in some embodiments, from about 5 to about 15 millimeters. The width "W" of the anode may also be from about 0.05 to about 40 millimeters, in some embodiments, from about 0.5 to about 25 millimeters, and in some embodiments, from about 2 to about 10 millimeters.

As indicated above, the thickness of the planar anode is small to improve the electrical performance and volumetric efficiency of the resulting capacitor. In FIG. 3, for example, the thickness of the anode 200 is represented by the dimension "H." Typically, the thickness of the anode is about 5 millimeters or less, in some embodiments, from about 0.05 to about 4 millimeters, and in some embodiments, from about 0.1 to about 3.5 millimeters. The ratio of the length of the anode to the thickness of the anode is from about 5 to about 50, in some embodiments from about 6 to about 30, and in some embodiments, from about 7 to about 20. Although shown as a "D-shape" in FIG. 2, it should also be understood that the anode may possess any other desired shape, such as square, rectangle, circle, oval, triangle, etc. Polygonal shapes having more than four (4) edges (e.g., hexagon, octagon, heptagon, pentagon, etc.) are particularly desired due to their relatively high surface area.

The anode also contains a dielectric formed by anodically oxidizing ("anodizing") the sintered anode so that a dielectric layer is formed over and/or within the anode. For example, a tantalum (Ta) anode may be anodized to tantalum pentoxide ($Ta_2O_5$). Typically, anodization is performed by initially applying a solution to the anode, such as by dipping anode into the electrolyte. Aqueous solvents (e.g., water) and/or non-aqueous solvents (e.g., ethylene glycol) may be employed. To enhance ionic conductivity, a compound may be employed that is capable of dissociating in the solvent to form ions. Examples of such compounds include, for instance, acids, such as described below with respect to the electrolyte. For example, an acid (e.g., phosphoric acid) may constitute from about 0.01 wt. % to about 5 wt. %, in some embodiments from about 0.05 wt. % to about 0.8 wt. %, and in some embodiments, from about 0.1 wt. % to about 0.5 wt. % of the anodizing solution. If desired, blends of acids may also be employed.

A current is passed through the anodizing solution to form the dielectric layer. The value of the formation voltage manages the thickness of the dielectric layer. For example, the power supply may be initially set up at a galvanostatic mode until the required voltage is reached. Thereafter, the power supply may be switched to a potentiostatic mode to ensure that the desired dielectric thickness is formed over the entire surface of the anode. Of course, other known methods may also be employed, such as pulse or step potentiostatic methods. The voltage at which anodic oxidation occurs is typically high to achieve a capacitor capable of operating at a high voltage range. That is, the voltage is typically from about 100 volts to about 300 volts, in some embodiments from about 150 volts to about 250 volts, and in some embodiments, from about 170 volts to about 220 volts. The temperature of the anodizing solution may range from about 10° C. to about 200° C., in some embodiments from about 20° C. to about 60° C., and in some embodiments, from about 30° C. to about 40° C. (e.g., 37° C.). The resulting dielectric layer may be formed on a surface of the anode and within its pores. When employed, the specific nature of the powder may allow the resulting anode to achieve a high specific charge even at the high formation voltages often employed in the present invention. For example, within the ranges noted above, the anode may still be able to a specific charge of from about 2,000 µF*V/g to about 20,000 µF*V/g, in some embodiments from about 5,000 µF*V/g to about 15,000 µF*V/g or more, and in some embodiments, from about 8,000 to about 12,000 µF*V/g.

II. Cathode

In addition to the anode, a cathode is also employed in the capacitor that may be constructed using any of a variety of techniques. In one embodiment, the cathode contains a metal substrate, which may include any metal, such as tantalum, niobium, aluminum, nickel, hafnium, titanium, copper, silver, steel (e.g., stainless), alloys thereof (e.g., electrically conductive oxides), composites thereof (e.g., metal coated with electrically conductive oxide), and so forth. Titanium and tantalum, as well as alloys thereof, are particularly suitable for use in the present invention. The geometric configuration of the substrate may generally vary as is well known to those skilled in the art, such as in the form of a container, can, foil, sheet, screen, mesh, etc. In one embodiment, for example, the metal substrate forms a casing having a generally cylindrical shape. It should be understood, however, that any geometric configuration may be employed in the present invention, such as D-shaped, rectangular, triangular, prismatic, etc. The casing may optionally include a lid that covers the anode and electrolyte, which may be formed from the same or different material than the casing.

The substrate may be roughened to increase its surface area and increase the degree to which an electrochemically active material may be able to adhere thereto. In one embodiment, for example, the surface is chemically etched, such as by applying a solution of a corrosive substance (e.g., hydrochloric acid) to the surface. The surface may also be electrochemically etched, such as by applying a voltage to a solution of the corrosive substance so that it undergoes electrolysis. The voltage may be raised to a sufficiently high level to initiate "sparking" at the surface of the substrate, which is believed to create high local surface temperatures sufficient that etches away the substrate. This technique is described in more detail in U.S. Patent Application Publication No. 2010/0142124 to Dreissig, et al., which is incorporated herein in its entirety by reference thereto for all purposes. In addition to chemical or electrochemical roughening techniques, mechanical roughening may also be employed. In one embodiment, for instance, the surface of the metal substrate may be abrasive blasted by propelling a stream of abrasive media (e.g., sand) against at least a portion of a surface thereof.

An electrochemically-active material may also be applied to the cathode substrate to inhibit corrosion and also act as a heat barrier when voltage is increased. Any of a variety of known electrochemically-active materials may generally be employed. One suitable material is a conductive polymer, such as those that are π-conjugated and have electrical conductivity after oxidation or reduction (e.g., electrical conductivity of at least about 1 µS cm$^{-1}$ after oxidation). Examples of such π-conjugated conductive polymers include, for instance, polyheterocycles (e.g., polypyrroles, polythiophenes, polyanilines, etc.), polyacetylenes, poly-p-phenylenes, polyphenolates, and so forth.

Substituted polythiophenes are particularly suitable for use as the electrochemically active material in the present invention. Without intending to be limited by theory, it is believed that charging of the capacitor to a high voltage (e.g., greater than the formation voltage) forces ions of the electrolyte into coatings containing such substituted polythiophenes. This causes the conductive polymer to "swell" and retain the ions near the surface, thereby enhancing charge density. Because the polymer is generally amorphous and non-crystalline, it can also dissipate and/or absorb the heat associated with the high voltage. Upon discharge, it is also believed that the substituted polythiophene "relaxes" and allows ions in the electrolyte to move out of the coating. Through such swelling and relaxation mechanism, charge density near the metal substrate can be increased without a chemical reaction with the electrolyte. Accordingly, mechanical robustness and good electrical performance may be provided without the need for conventional conductive coatings, such as those made from activated carbon or metal oxides (e.g., ruthenium oxide). In fact, excellent results may be achieved using the coating as the principal material on the metal substrate. That is, the coating may constitute at least about 90 wt. %, in some embodiments at least about 92 wt. %, and in some embodiments, at least about 95 wt. % of the material(s) present on the metal substrate. Nevertheless, it should be understood that other conductive coatings may also be used in some embodiments of the present invention.

In one particular embodiment, the substituted polythiophene has recurring units of general formula (I), formula (II), or both:

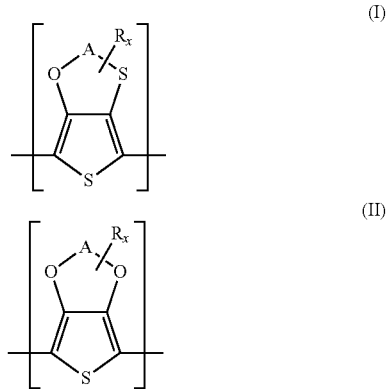

wherein,

A is an optionally substituted $C_1$ to $C_5$ alkylene radical (e.g., methylene, ethylene, n-propylene, n-butylene, n-pentylene, etc.);

R is a linear or branched, optionally substituted $C_1$ to $C_{18}$ alkyl radical (e.g., methyl, ethyl, n- or iso-propyl, n-, iso-, sec- or tert-butyl, n-pentyl, 1-methylbutyl, 2-methylbutyl, 3-methylbutyl, 1-ethylpropyl, 1,1-dimethylpropyl, 1,2-dimethylpropyl, 2,2-dimethylpropyl, n-hexyl, n-heptyl, n-octyl, 2-ethylhexyl, n-nonyl, n-decyl, n-undecyl, n-dodecyl, n-tridecyl, n-tetradecyl, n-hexadecyl, n-octadecyl, etc.); optionally substituted $C_5$ to $C_{12}$ cycloalkyl radical (e.g., cyclopentyl, cyclohexyl, cycloheptyl, cyclooctyl, cyclononyl cyclodecyl, etc.); optionally substituted $C_6$ to $C_{14}$ aryl radical (e.g., phenyl, naphthyl, etc.); optionally substituted $C_7$ to $C_{18}$ aralkyl radical (e.g., benzyl, o-, m-, p-tolyl, 2,3-, 2,4-, 2,5-, 2-6, 3-4-, 3,5-xylyl, mesityl, etc.); optionally substituted $C_1$ to $C_4$ hydroxyalkyl radical, or hydroxyl radical; and x is an integer from 0 to 8, in some embodiments, from 0 to 2, and in some embodiments, x is 0. Example of substituents for the radicals "A" or "R" include, for instance, alkyl, cycloalkyl, aryl, aralkyl, alkoxy, halogen, ether, thioether, disulphide, sulfoxide, sulfone, sulfonate, amino, aldehyde, keto, carboxylic acid ester, carboxylic acid, carbonate, carboxylate, cyano, alkylsilane and alkoxysilane groups, carboxylamide groups, and so forth.

The total number of recurring units of general formula (I) or formula (II) or of general formulae (I) and (II) is typically from 2 to 2,000, and in some embodiments, from 2 to 100.

Particularly suitable substituted polythiophenes are those in which "A" is an optionally substituted $C_2$ to $C_3$ alkylene radical and x is 0 or 1. In one particular embodiment, the substituted polythiophene is poly(3,4-ethylenedioxythiophene) ("PEDT"), which has recurring units of formula (II), wherein "A" is $CH_2$—$CH_2$ and "x" is 0. The monomers used to form such polymers may vary as desired. For instance, particularly suitable monomers are substituted 3,4-alkylenedioxythiophenes having the general formula (III), (IV), or both:

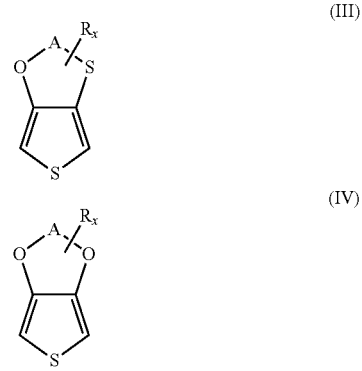

wherein, A, R, and X are as defined above.

Examples of such monomers include, for instance, optionally substituted 3,4-ethylenedioxythiophenes. One commercially suitable example of 3,4-ethylenedioxthiophene is available from H. C. Starck GmbH under the designation Clevios™ M. Derivatives of these monomers may also be employed that are, for example, dimers or trimers of the above monomers. Higher molecular derivatives, i.e., tetramers, pentamers, etc. of the monomers are suitable for use in the present invention. The derivatives may be made up of identical or different monomer units and used in pure form and in a mixture with one another and/or with the monomers. Oxidized or reduced forms of these precursors may also be employed.

The thiophene monomers, such as described above, may be chemically polymerized in the presence of an oxidative catalyst. The oxidative catalyst typically includes a transition metal cation, such as iron(III), copper(II), chromium(VI), cerium(IV), manganese(IV), manganese(VII), ruthenium (III) cations, etc. A dopant may also be employed to provide excess charge to the conductive polymer and stabilize the conductivity of the polymer. The dopant typically includes an inorganic or organic anion, such as an ion of a sulfonic acid. In certain embodiments, the oxidative catalyst employed in the precursor solution has both a catalytic and doping functionality in that it includes a cation (e.g., transition metal) and anion (e.g., sulfonic acid). For example, the oxidative catalyst may be a transition metal salt that includes iron(III) cations, such as iron(III) halides (e.g., $FeCl_3$) or iron(III) salts of other inorganic acids, such as $Fe(ClO_4)_3$ or $Fe_2(SO_4)_3$ and the iron (III) salts of organic acids and inorganic acids comprising organic radicals. Examples of iron(III) salts of inorganic acids with organic radicals include, for instance, iron(III) salts of sulfuric acid monoesters of $C_1$ to $C_{20}$ alkanols (e.g., iron(III) salt of lauryl sulfate). Likewise, examples of iron (III) salts of organic acids include, for instance, iron(III) salts of $C_1$ to $C_{20}$ alkane sulfonic acids (e.g., methane, ethane, propane, butane, or dodecane sulfonic acid); iron(III) salts of aliphatic perfluorosulfonic acids (e.g., trifluoromethane sulfonic acid, perfluorobutane sulfonic acid, or perfluorooctane sulfonic acid); iron(III) salts of aliphatic $C_1$ to $C_{20}$ carboxylic acids (e.g., 2-ethylhexylcarboxylic acid); iron(III) salts of aliphatic perfluorocarboxylic acids (e.g., trifluoroacetic acid or perfluorooctane acid); iron(III) salts of aromatic sulfonic acids optionally substituted by $C_1$ to $C_{20}$ alkyl groups (e.g., benzene sulfonic acid, o-toluene sulfonic acid, p-toluene sulfonic acid, or dodecylbenzene sulfonic acid); iron(III) salts of cycloalkane sulfonic acids (e.g., camphor sulfonic acid); and so forth. Mixtures of these above-mentioned iron(III) salts may also be used. Iron(III)-p-toluene sulfonate, iron(III)-o-toluene sulfonate, and mixtures thereof, are particularly suitable. One commercially suitable example of iron(III)-p-toluene sulfonate is available from H. C. Starck GmbH under the designation Clevios™ C.

Various methods may be utilized to form the conductive coating on a metal substrate. In one embodiment, the oxidative catalyst and monomer are applied, either sequentially or together, such that the polymerization reaction occurs in situ on the part. Suitable application techniques may include screen-printing, dipping, electrophoretic coating, and spraying, may be used to form a conductive polymer coating. As an example, monomer may initially be mixed with the oxidative catalyst to form a precursor solution. Once the mixture is formed, it may be applied to the metal substrate and then allowed to polymerize so that the conductive coating is formed on the surface. Alternatively, the oxidative catalyst and monomer may be applied sequentially. In one embodiment, for example, the oxidative catalyst is dissolved in an organic solvent (e.g., butanol) and then applied as a dipping solution. The substrate may then be dried to remove the solvent therefrom. Thereafter, the substrate may be dipped into a solution containing the monomer.

Polymerization is typically performed at temperatures of from about –10° C. to about 250° C., and in some embodiments, from about 0° C. to about 200° C., depending on the oxidizing agent used and desired reaction time. Suitable polymerization techniques, such as described above, may be described in more detail in U.S. Publication No. 2008/232037 to Biler. Still other methods for applying such conductive coating(s) may be described in U.S. Pat. No. 5,457,862 to Sakata, et al., U.S. Pat. No. 5,473,503 to Sakata, et al., U.S. Pat. No. 5,729,428 to Sakata, et al., and U.S. Pat. No. 5,812, 367 to Kudoh, et al., which are incorporated herein in their entirety by reference thereto for all purposes.

In addition to in situ application, the conductive coating may also be applied to the substrate in the form of a dispersion of conductive polymer particles. Although their size may vary, it is typically desired that the particles possess a small diameter to increase the surface area available for adhering to the anode part. For example, the particles may have an average diameter of from about 1 to about 500 nanometers, in some embodiments from about 5 to about 400 nanometers, and in some embodiments, from about 10 to about 300 nanometers. The $D_{90}$ value of the particles (particles having a diameter of less than or equal to the $D_{90}$ value constitute 90% of the total volume of all of the solid particles) may be about 15 micrometers or less, in some embodiments about 10 micrometers or less, and in some embodiments, from about 1 nanometer to about 8 micrometers. The diameter of the particles may be determined using known techniques, such as by ultracentrifuge, laser diffraction, etc.

The formation of the conductive polymers into a particulate form may be enhanced by using a separate counterion to counteract the positive charge carried by the substituted polythiophene. In some cases, the polymer may possess positive and negative charges in the structural unit, with the positive charge being located on the main chain and the negative charge optionally on the substituents of the radical "R", such as sulfonate or carboxylate groups. The positive charges of the main chain may be partially or wholly saturated with the optionally present anionic groups on the radicals "R." Viewed overall, the polythiophenes may, in these cases, be cationic, neutral or even anionic. Nevertheless, they are all regarded as cationic polythiophenes as the polythiophene main chain has a positive charge.

The counterion may be a monomeric or polymeric anion. Polymeric anions can, for example, be anions of polymeric carboxylic acids (e.g., polyacrylic acids, polymethacrylic acid, polymaleic acids, etc.); polymeric sulfonic acids (e.g., polystyrene sulfonic acids ("PSS"), polyvinyl sulfonic acids, etc.); and so forth. The acids may also be copolymers, such as copolymers of vinyl carboxylic and vinyl sulfonic acids with other polymerizable monomers, such as acrylic acid esters and styrene. Likewise, suitable monomeric anions include, for example, anions of $C_1$ to $C_{20}$ alkane sulfonic acids (e.g., dodecane sulfonic acid); aliphatic perfluorosulfonic acids (e.g., trifluoromethane sulfonic acid, perfluorobutane sulfonic acid or perfluorooctane sulfonic acid); aliphatic $C_1$ to $C_{20}$ carboxylic acids (e.g., 2-ethyl-hexylcarboxylic acid); aliphatic perfluorocarboxylic acids (e.g., trifluoroacetic acid or perfluorooctanoic acid); aromatic sulfonic acids optionally substituted by $C_1$ to $C_{20}$ alkyl groups (e.g., benzene sulfonic acid, o-toluene sulfonic acid, p-toluene sulfonic acid or dodecylbenzene sulfonic acid); cycloalkane sulfonic acids (e.g., camphor sulfonic acid or tetrafluoroborates, hexafluorophosphates, perchlorates, hexafluoroantimonates, hexafluoroarsenates or hexachloroantimonates); and so forth. Particularly suitable counteranions are polymeric anions, such as a polymeric carboxylic or sulfonic acid (e.g., polystyrene sulfonic acid ("PSS")). The molecular weight of such polymeric anions typically ranges from about 1,000 to about 2,000,000, and in some embodiments, from about 2,000 to about 500,000.

When employed, the weight ratio of such counterions to substituted polythiophenes in a given layer is typically from about 0.5:1 to about 50:1, in some embodiments from about 1:1 to about 30:1, and in some embodiments, from about 2:1 to about 20:1. The weight of the substituted polythiophene corresponds referred to the above-referenced weight ratios refers to the weighed-in portion of the monomers used, assuming that a complete conversion occurs during polymerization.

The dispersion may also contain one or more binders to further enhance the adhesive nature of the polymeric layer and also increase the stability of the particles within the dispersion. The binders may be organic in nature, such as polyvinyl alcohols, polyvinyl pyrrolidones, polyvinyl chlorides, polyvinyl acetates, polyvinyl butyrates, polyacrylic acid esters, polyacrylic acid amides, polymethacrylic acid esters, polymethacrylic acid amides, polyacrylonitriles, styrene/acrylic acid ester, vinyl acetate/acrylic acid ester and ethylene/vinyl acetate copolymers, polybutadienes, polyisoprenes, polystyrenes, polyethers, polyesters, polycarbonates, polyurethanes, polyamides, polyimides, polysulfones, melamine formaldehyde resins, epoxide resins, silicone resins or celluloses. Crosslinking agents may also be employed to enhance the adhesion capacity of the binders. Such crosslinking agents may include, for instance, melamine compounds, masked isocyanates or functional silanes, such as 3-glycidoxypropyltrialkoxysilane, tetraethoxysilane and tetraethoxysilane hydrolysate or crosslinkable polymers, such as polyurethanes, polyacrylates or polyolefins, and subsequent crosslinking. Other components may also be included within the dispersion as is known in the art, such as dispersion agents (e.g., water), surface-active substances, etc.

If desired, one or more of the above-described application steps may be repeated until the desired thickness of the coating is achieved. In some embodiments, only a relatively thin layer of the coating is formed at a time. The total target thickness of the coating may generally vary depending on the desired properties of the capacitor. Typically, the resulting conductive polymer coating has a thickness of from about 0.2 micrometers ("μm") to about 50 μm, in some embodiments from about 0.5 μm to about 20 μm, and in some embodiments, from about 1 μm to about 5 μm. It should be understood that the thickness of the coating is not necessarily the same at all locations on the metal substrate. Nevertheless, the average thickness of the coating on the substrate generally falls within the ranges noted above.

The conductive polymer coating may optionally be healed. Healing may occur after each application of a conductive polymer layer or may occur after the application of the entire conductive polymer coating. In some embodiments, the conductive polymer can be healed by dipping the metal substrate into an electrolyte solution, and thereafter applying a constant voltage to the solution until the current is reduced to a preselected level. If desired, such healing can be accomplished in multiple steps. For example, an electrolyte solution can be a dilute solution of the monomer, the catalyst, and dopant in an alcohol solvent (e.g., ethanol). The coating may also be washed if desired to remove various byproducts, excess reagents, and so forth.

III. Working Electrolyte

The capacitor of the present invention also employs a working electrolyte that is the electrically active material that provides the connecting path between the anode and cathode. The working electrolyte is generally in the form of a liquid, such as a solution (e.g., aqueous or non-aqueous), dispersion, gel, etc. If desired, the anode may initially be impregnated with an electrolyte (not shown) before being positioned within the casing. The electrolyte may also be added to the capacitor at a later stage of production. Various suitable electrolytes are described in U.S. Pat. Nos. 5,369,547 and 6,594,140 to Evans, et al., which are incorporated herein their entirety by reference thereto for all purposes.

Typically, the electrolyte is ionically conductive in that has an ionic conductivity of from about 0.5 to about 100 milliSiemens per centimeter ("mS/cm"), in some embodiments from about 1 to about 80 mS/cm, in some embodiments from about 5 mS/cm to about 60 mS/cm, and in some embodiments, from about 10 to about 40 mS/cm, determined at a temperature of 25° C. using any known electric conductivity meter (e.g., Oakton Con Series 11). Within the ranges noted above, it is believed that the ionic conductivity of the electrolyte allows the electric field to extend into the electrolyte to a length (Debye length) sufficient to result in significant charge separation. This extends the potential energy of the dielectric to the electrolyte so that the resulting capacitor is able to store even more potential energy than predicted by the thickness of the dielectric. In other words, the capacitor may be charged to a voltage that exceeds the formation voltage of the dielectric. The ratio of the voltage to which the capacitor can be charged to the formation voltage may, for instance, be greater than about 1, in some embodiments from about 1 to about 2, and in some embodiments, from about 1.1 to about 1.5. As an example, the voltage to which the capacitor is charged may be from about 120 volts to about 320 volts, in some embodiments from about 180 volts to about 280 volts, and in some embodiments, from about 200 volts to about 240 volts.

The desired ionic conductivity may be achieved by selecting ionic compound(s) (e.g., acids, bases, salts, and so forth) within certain concentration ranges. In one particular embodiment, salts of weak organic acids may be effective in achieving the desired conductivity of the electrolyte. The cation of the salt may include monatomic cations, such as alkali metals (e.g., $Li^+$, $Na^+$, $K^+$, $Rb^+$, or $Cs^+$), alkaline earth metals (e.g., $Be^{2+}$, $Mg^{2+}$, $Ca^{2+}$, $Sr^{2+}$ or $Ba^{2+}$), transition metals (e.g., $Ag^+$, $Fe^{2+}$, $Fe^{3+}$, etc.), as well as polyatomic cations, such as $NH_4^+$. The monovalent ammonium ($NH_4^+$), sodium ($Na^+$), and lithium ($Li^+$) are particularly suitable cations for use in the present invention. The organic acid used to form the anion of the salt is "weak" in the sense that it typically has a first acid dissociation constant ($pK_{a1}$) of about 0 to about 11, in some embodiments about 1 to about 10, and in some embodiments, from about 2 to about 10, determined at 25° C. Any suitable weak organic acids may be used in the present invention, such as carboxylic acids, such as acrylic acid, methacrylic acid, malonic acid, succinic acid, salicylic acid, sulfosalicylic acid, adipic acid, maleic acid, malic acid, oleic acid, gallic acid, tartaric acid (e.g., dextotartaric acid, meso-tartaric acid, etc.), citric acid, formic acid, acetic acid, glycolic acid, oxalic acid, propionic acid, phthalic acid, isophthalic acid, glutaric acid, gluconic acid, lactic acid, aspartic acid, glutaminic acid, itaconic acid, trifluoroacetic acid, barbituric acid, cinnamic acid, benzoic acid, 4-hydroxybenzoic acid, aminobenzoic acid, etc.; blends thereof, and so forth. Polyprotic acids (e.g., diprotic, triprotic, etc.) are particularly desirable for use in forming the salt, such as adipic acid ($pK_{a1}$ of 4.43 and $pK_{a2}$ of 5.41), α-tartaric acid ($pK_{a1}$ of 2.98 and $pK_{a2}$ of 4.34), meso-tartaric acid ($pK_{a1}$ of 3.22 and $pK_{a2}$ of 4.82), oxalic acid ($pK_{a1}$ of 1.23 and $pK_{a2}$ of 4.19), lactic acid ($pK_{a1}$ of 3.13, $pK_{a2}$ of 4.76, and $pK_{a3}$ of 6.40), etc.

While the actual amounts may vary depending on the particular salt employed, its solubility in the solvent(s) used in the electrolyte, and the presence of other components, such weak organic acid salts are typically present in the electrolyte in an amount of from about 0.1 to about 25 wt. %, in some embodiments from about 0.2 to about 20 wt. %, in some embodiments from about 0.3 to about 15 wt. %, and in some embodiments, from about 0.5 to about 5 wt. %.

The electrolyte is typically aqueous in that it contains an aqueous solvent, such as water (e.g., deionized water). For example, water (e.g., deionized water) may constitute from about 20 wt. % to about 95 wt. %, in some embodiments from about 30 wt. % to about 90 wt. %, and in some embodiments, from about 40 wt. % to about 85 wt % of the electrolyte. A secondary solvent may also be employed to form a solvent mixture. Suitable secondary solvents may include, for instance, glycols (e.g., ethylene glycol, propylene glycol, butylene glycol, triethylene glycol, hexylene glycol, polyethylene glycols, ethoxydiglycol, dipropyleneglycol, etc.); glycol ethers (e.g., methyl glycol ether, ethyl glycol ether, isopropyl glycol ether, etc.); alcohols (e.g., methanol, ethanol, n-propanol, iso-propanol, and butanol); ketones (e.g., acetone, methyl ethyl ketone, and methyl isobutyl ketone); esters (e.g., ethyl acetate, butyl acetate, diethylene glycol ether acetate, methoxypropyl acetate, ethylene carbonate, propylene carbonate, etc.); amides (e.g., dimethylformamide, dimethylacetamide, dimethylcaprylic/capric fatty acid amide and N-alkylpyrrolidones); sulfoxides or sulfones (e.g., dimethyl sulfoxide (DMSO) and sulfolane); and so forth. Such solvent mixtures typically contain water in an amount from about 40 wt. % to about 80 wt. %, in some embodiments from about 50 wt. % to about 75 wt. %, and in some embodiments, from about 55 wt. % to about 70 wt. % and secondary solvent(s) in an amount from about 20 wt. % to about 60 wt. %, in some embodiments from about 25 wt. % to about 50 wt. %, and in some embodiments, from about 30 wt. % to about 45 wt. %. The secondary solvent(s) may, for example, constitute from about 5 wt. % to about 45 wt. %, in some embodiments from about 10 wt. % to about 40 wt. %, and in some embodiments, from about 15 wt. % to about 35 wt. % of the electrolyte.

If desired, the electrolyte may be relatively neutral and have a pH of from about 4.5 to about 7.0, in some embodiments from about 5.0 to about 6.5, and in some embodiments, from about 5.5 to about 6.0. Among other things, such a pH may enhance the ability of hydrogen ions present in an aqueous electrolyte to interact with the cathode material to achieve maximum capacitance and thus energy density. One or more pH adjusters (e.g., acids, bases, etc.) may be employed to help achieve the desired pH. In one embodiment, an acid is employed to lower the pH to the desired range. Suitable acids include, for instance, inorganic acids, such as hydrochloric acid, nitric acid, sulfuric acid, phosphoric acid, polyphosphoric acid, boric acid, boronic acid, etc.; organic acids, including carboxylic acids, such as acrylic acid, methacrylic acid, malonic acid, succinic acid, salicylic acid, sulfosalicylic acid, adipic acid, maleic acid, malic acid, oleic acid, gallic acid, tartaric acid, citric acid, formic acid, acetic acid, glycolic acid, oxalic acid, propionic acid, phthalic acid, isophthalic acid, glutaric acid, gluconic acid, lactic acid, aspartic acid, glutaminic acid, itaconic acid, trifluoroacetic acid, barbituric acid, cinnamic acid, benzoic acid, 4-hydroxybenzoic acid, aminobenzoic acid, etc.; sulfonic acids, such as methanesulfonic acid, benzenesulfonic acid, toluenesulfonic acid, trifluoromethanesulfonic acid, styrenesulfonic acid, naphthalene disulfonic acid, hydroxybenzenesulfonic acid, etc.; polymeric acids, such as poly(acrylic) or poly(methacrylic) acid and copolymers thereof (e.g., maleic-acrylic, sulfonic-acrylic, and styrene-acrylic copolymers), carageenic acid, carboxymethyl cellulose, alginic acid, etc.; and so forth. Although the total concentration of pH adjusters may vary, they are typically present in an amount of from about 0.01 wt. % to about 10 wt. %, in some embodiments from about 0.05 wt. % to about 5 wt. %, and in some embodiments, from about 0.1 wt. % to about 2 wt. % of the electrolyte.

The electrolyte may also contain other components that help improve the electrical performance of the capacitor. For instance, a depolarizer may be employed in the electrolyte to help inhibit the evolution of hydrogen gas at the cathode of the electrolytic capacitor, which could otherwise cause the capacitor to bulge and eventually fail. When employed, the depolarizer normally constitutes from about 1 to about 500 parts per million ("ppm"), in some embodiments from about 10 to about 200 ppm, and in some embodiments, from about 20 to about 150 ppm of the electrolyte. Suitable depolarizers may include nitroaromatic compounds, such as 2-nitrophenol, 3-nitrophenol, 4-nitrophenol, 2-nitrobenzonic acid, 3-nitrobenzonic acid, 4-nitrobenzonic acid, 2-nitroace tophenone, 3-nitroacetophenone, 4-nitroacetophenone, 2-nitroanisole, 3-nitroanisole, 4-nitroanisole, 2-nitrobenzaldehyde, 3-nitrobenzaldehyde, 4-nitrobenzaldehyde, 2-nitrobenzyl alcohol, 3-nitrobenzyl alcohol, 4-nitrobenzyl alcohol, 2-nitrophthalic acid, 3-nitrophthalic acid, 4-nitrophthalic acid, and so forth. Particularly suitable nitroaromatic depolarizers for use in the present invention are nitrobenzoic acids, anhydrides or salts thereof, substituted with one or more alkyl groups (e.g., methyl, ethyl, propyl, butyl, etc.). Specific examples of such alkyl-substituted nitrobenzoic compounds include, for instance, 2-methyl-3-nitrobenzoic add; 2-methyl-6-nitrobenzoic acid; 3-methyl-2-nitrobenzoic acid; 3-methyl-4-nitrobenzoic acid; 3-methyl-6-nitrobenzoic acid; 4-methyl-3-nitrobenzoic acid; anhydrides or salts thereof; and so forth.

Figure 4:
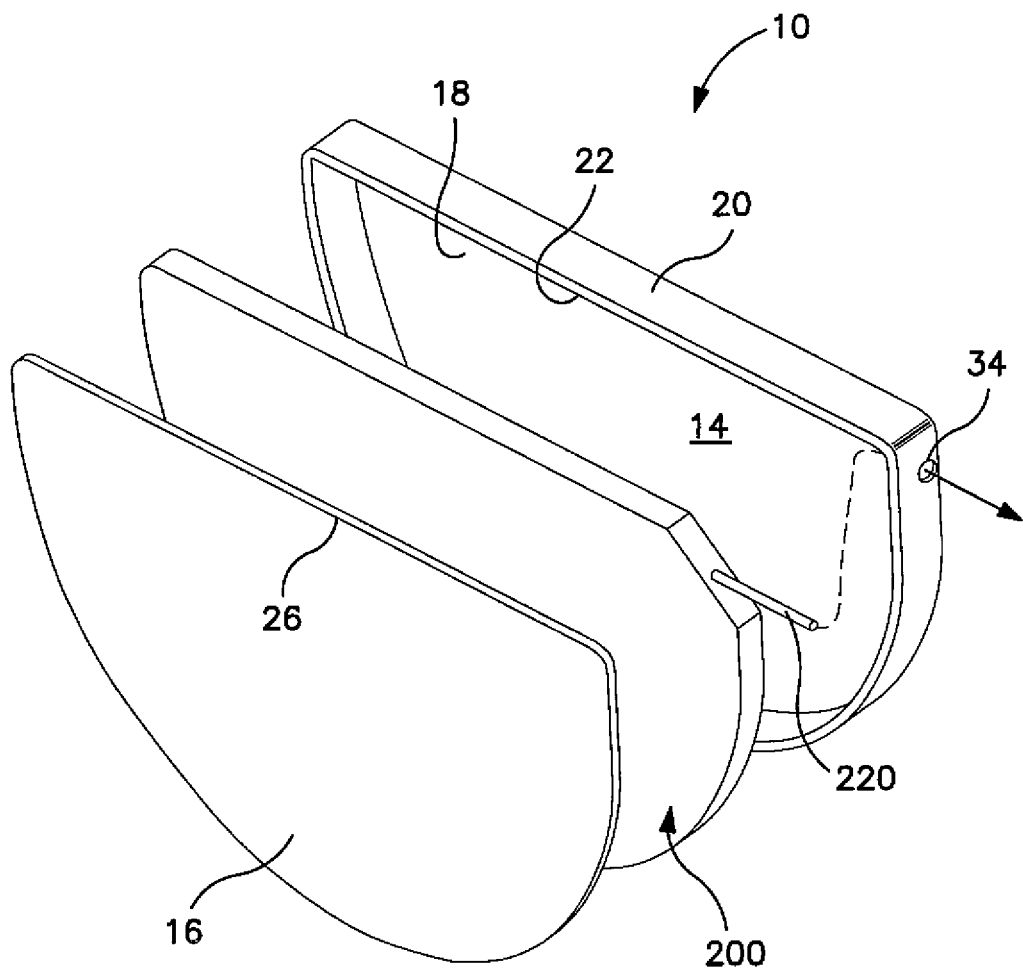
FIG. 4 is a perspective view illustrating the assembly of the anode of FIG. 2 with casing components to form the capacitor shown in FIG. 1.

The particular manner in which the components are incorporated into the capacitor is not critical and may be accomplished using a variety of techniques. In most embodiments, however, the anode is positioned within a casing. Referring to FIGS. 1 and 4, for example, one embodiment of a capacitor 10 is shown that includes the anode 200 shown in FIGS. 2-3. Although only one anode is shown, it should be understood that multiple anodes (e.g., stack) may be employed as is described, for instance, in U.S. Pat. No. 7,483,260 to Ziarniak, et al. In the illustrated embodiment, the anode 200 may be positioned within a casing 12 made of a first casing member 14 and a second casing member 16. The first casing member 14 has a sidewall 18 joined to a surrounding sidewall 20 extending to an edge 22. The second casing member 16 is in the shape of a plate and contains a second face wall 24 having a surrounding edge 26. The casing members 14 and 16 may be hermetically sealed together by welding (e.g., laser welding) the overlapping edges 22 and 26 where the contact each other. The casing members 14 and/or 16 may be analogous to the metal substrate described above such that an electrochemically-active material (not shown) may be deposited on the interior surface thereof. Alternatively, a separate metal substrate may be located adjacent to the casing member 14 and/or 16 and applied with the electrochemically-active material.

Although not shown, one or more separators may be employed that help insulate the anode and electrochemically-active material from each other. Examples of suitable materials for this purpose include, for instance, porous polymer materials (e.g., polypropylene, polyethylene, etc.), porous inorganic materials (e.g., fiberglass mats, porous glass paper, etc.), ion exchange resin materials, etc. Particular examples include ionic perfluoronated sulfonic acid polymer membranes (e.g., Nafion™ from the E.I. DuPont de Nemeours & Co.), sulphonated fluorocarbon polymer membranes, polybenzimidazole (PBI) membranes, and polyether ether ketone (PEEK) membranes. Although preventing direct contact between the anode and cathode, the separator permits ionic current flow of the electrolyte to the electrodes.

A feedthrough 30 may also be employed that electrically insulates the anode wire 200 from the casing 12. The feedthrough 30 extends from within the casing 12 to the outside thereof. A hole 34 may be provided in the surrounding sidewall 20 of the casing member 14 into which the feedthrough 30. The feedthrough 30 may, for example, be a glass-to-metal seal ("GTMS") that contains a ferrule (not shown) with an internal cylindrical bore of a constant inside diameter. An insulative glass can thus provide a hermetic seal between the bore and the anode wire 200 passing therethrough.

After assembly and sealing (e.g., welding), an electrolyte may be introduced into the casing through a fill-port. Filling may be accomplished by placing the capacitor in a vacuum chamber so that the fill-port extends into a reservoir of the electrolyte. When the chamber is evacuated, pressure is reduced inside the capacitor. When the vacuum is released, pressure inside the capacitor re-equilibrates, and the electrolyte is drawn through the fill-port into the capacitor.

Regardless of its particular configuration, the capacitor of the present invention may exhibit excellent electrical properties. For example, the capacitor may exhibit a high volumetric efficiency, such as from about 50,000 µF*V/cm³ to about 300,000 µF*V/cm³, in some embodiments from about 60,000 µF*V/cm³ to about 200,000 µF*V/cm³, and in some embodiments, from about 80,000 µF*V/cm³ to about 150,000 µF*V/cm³, determined at a frequency of 120 Hz and at room temperature (e.g., 25° C.). Volumetric efficiency is determined by multiplying the formation voltage of a part by its capacitance, and then dividing by the product by the volume of the part. For example, a formation voltage may be 175 volts for a part having a capacitance of 520 µF, which results in a product of 91,000 µF*V. If the part occupies a volume of about 0.8 cm³, this results in a volumetric efficiency of about 113,750 µF*V/cm³.

The capacitor may also exhibit a high energy density that enables it suitable for use in high pulse applications. Energy density is generally determined according to the equation $E=1/2*CV^2$, where C is the capacitance in farads (F) and V is the working voltage of capacitor in volts (V). The capacitance may, for instance, be measured using a capacitance meter (e.g., Keithley 3330 Precision LCZ meter with Kelvin Leads, 2 volts bias and 1 volt signal) at operating frequencies of from 10 to 120 Hz (e.g., 120 Hz) and a temperature of 25° C. For example, the capacitor may exhibit an energy density of about 2.0 joules per cubic centimeter (J/cm³) or more, in some embodiments about 3.0 J/cm³, in some embodiments from about 3.5 J/cm³ to about 10.0 J/cm³, and in some embodiments, from about 4.0 to about 8.0 J/cm³. The capacitance may likewise be about 1 milliFarad per square centimeter ("mF/cm²") or more, in some embodiments about 2 mF/cm² or more, in some embodiments from about 5 to about 50 mF/cm², and in some embodiments, from about 8 to about 20 mF/cm².

The capacitor may also exhibit a relatively high "breakdown voltage" (voltage at which the capacitor fails), such as about 180 volts or more, in some embodiments about 200 volts or more, and in some embodiments, from about 210 volts to about 260 volts.

The equivalent series resistance ("ESR")—the extent that the capacitor acts like a resistor when charging and discharging in an electronic circuit—may also be less than about 15,000 milliohms, in some embodiments less than about 10,000 milliohms, in some embodiments less than about 5,000 milliohms, and in some embodiments, from about 1 to about 4,500 milliohms, measured with a 2-volt bias and 1-volt signal at a frequency of 120 Hz. In addition, the leakage current, which generally refers to the current flowing from one conductor to an adjacent conductor through an insulator, can be maintained at relatively low levels. For example, the numerical value of the normalized leakage current of a capacitor of the present invention is, in some embodiments, less than about 1 µA/µF*V, in some embodiments less than about 0.5 µA/µF*V, and in some embodiments, less than about 0.1 µA/µF*V, where µA is microamps and µF*V is the product of the capacitance and the rated voltage. Leakage current may be measured using a leakage test meter (e.g., MC 190 Leakage test, Mantracourt Electronics LTD, UK) at a temperature of 25° C. and at a certain rated voltage after a charging time of from about 60 to about 300 seconds. Such ESR and normalized leakage current values may even be maintained after aging for a substantial amount of time at high temperatures. For example, the values may be maintained for about 100 hours or more, in some embodiments from about 300 hours to about 2500 hours, and in some embodiments, from about 400 hours to about 1500 hours (e.g., 500 hours, 600 hours, 700 hours, 800 hours, 900 hours, 1000 hours, 1100 hours, or 1200 hours) at temperatures ranging from about 100° C. to about 250° C., and, in some embodiments from about 100° C. to about 200° C. (e.g., 100° C., 125° C., 150° C., 175° C., or 200° C.).

The electrolytic capacitor of the present invention may be used in various applications, including but not limited to medical devices, such as implantable defibrillators, pacemakers, cardioverters, neural stimulators, drug administering devices, etc.; automotive applications; military applications, such as RADAR systems; consumer electronics, such as radios, televisions, etc.; and so forth. In one embodiment, for example, the capacitor may be employed in an implantable medical device configured to provide a therapeutic high voltage (e.g., between approximately 500 volts and approximately 850 volts, or, desirably, between approximately 600 Volts and approximately 900 volts) treatment for a patient. The device may contain a container or housing that is hermetically sealed and biologically inert. One or more leads are electrically coupled between the device and the patient's heart via a vein. Cardiac electrodes are provided to sense cardiac activity and/or provide a voltage to the heart. At least a portion of the leads (e.g., an end portion of the leads) may be provided adjacent or in contact with one or more of a ventricle and an atrium of the heart. The device may also contain a capacitor bank that typically contains two or more capacitors connected in series and coupled to a battery that is internal or external to the device and supplies energy to the capacitor bank. Due in part to high conductivity, the capacitor of the present invention can achieve excellent electrical properties and thus be suitable for use in the capacitor bank of the implantable medical device.

The present invention may be better understood by reference to the following example.

EXAMPLE

The ability to form a capacitor in accordance with the present invention was demonstrated. Initially, both ends of a pre-cut tantalum lead wire were bent. The bent wire was placed into a slot in the bottom half of a mold. The cavity of the mold was then filled with C255 flake tantalum powder (Cabot Corp.) and polyethylene glycol lubricant (0.5%). A hydraulic press was used to compress both sides of the powder to a density of 7.5 g/cm$^3$ density to form thirty two (32) anode samples. After delubrication, sixteen (16) of the samples were vacuum sintered at 1600° C. for 40 minutes in a hanging crucible and sixteen (16) of the samples were vacuum sintered at 1650° C. for 40 minutes in a hanging crucible. Upon sintering, all of the samples were anodized in a solution containing 50% glycol/water with $H_3PO_4$ at a temperature of 85° C. and a conductivity of 1.3 mS/cm. The formation current density was 45 mA/g for each sample and the soak time was 90 minutes. Formation voltages of 200 volts and 225 volts were employed. Following the first formation, the oxide was annealed at 380° C. for 60 minutes. This was then followed by a second formation of 15 minutes at the same voltage. The resulting anode had a D-shape in which the length "L" was about 37 millimeters, the width "W" was about 20 millimeters, and the thickness "H" was about 2.1 millimeters (FIGS. 2-3).

Figure 6:
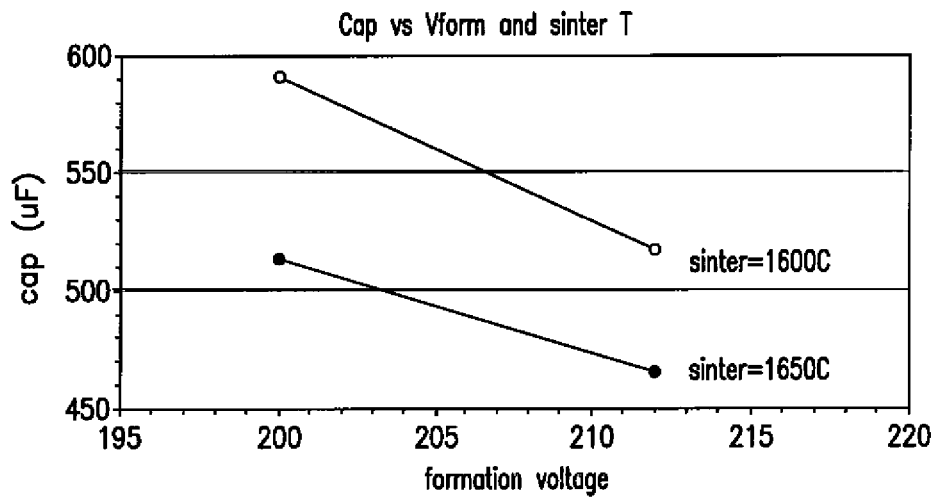
FIG. 6 shows the capacitance of anodes formed in the Example at various sintering temperatures and formation voltages.
Figure 7:
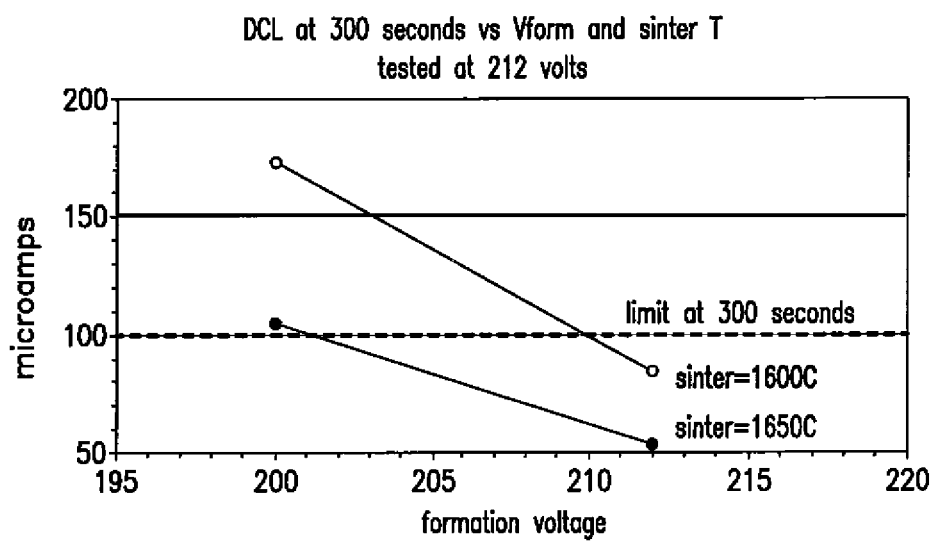
FIG. 7 shows the leakage current (at 300 seconds) of anodes formed in the Example at various sintering temperatures and formation voltages.
Figure 8:
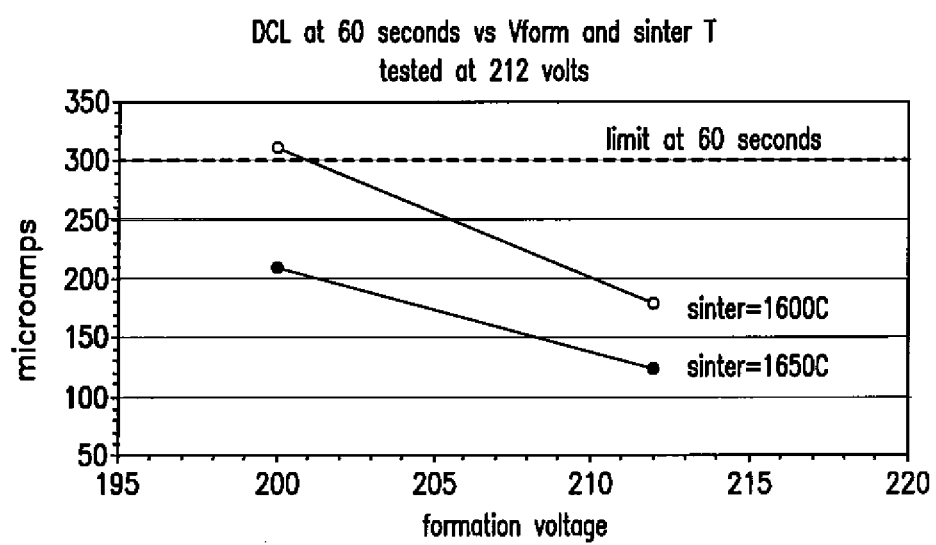
FIG. 8 shows the leakage current (at 60 seconds) of anodes formed in the Example at various sintering temperatures and formation voltages.

Once formed, capacitance ("Cap") and leakage current ("DCL") were tested in a neutral electrolyte at room temperature. Capacitance was measured by discharging from 150 volts through a 10,000 ohm resistor. Leakage current was determined by charging to 212 volts with a 1,000 ohm resistor in series and calculating the voltage drop across the resistor. The results are set forth in FIGS. 6-8.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A planar anode for use in a wet electrolytic capacitor, wherein the anode comprises an anodically oxidized pellet formed from a pressed and sintered powder, wherein the anode further comprises a leadwire containing only a first portion and a second portion, wherein the first portion extends outwardly from the pellet in a longitudinal direction and the second portion is embedded within the pellet, wherein the second portion is oriented at an angle of about 40° to about 120° relative to the longitudinal direction such that the second portion contains a single bend, wherein the ratio of the length of the second portion of the leadwire to the length of the anode is from about 0.1 to about 0.6, wherein the planar anode has a thickness of about 5 millimeters or less, and wherein the ratio of the length of the anode to the thickness of the anode is from about 5 to about 50.

2. The planar anode of claim 1, wherein the angle is from about 80° to about 100°.

3. The planar anode of claim 1, wherein the length of the second portion of the leadwire is from about 2 to about 20 millimeters and the length of the anode is from about 10 to about 60 millimeters.

4. The planar anode of claim 1, wherein the length of the second portion of the leadwire is from about 5 to about 15 millimeters and the length of the anode is from about 20 to about 50 millimeters.

5. The planar anode of claim 1, wherein the anode has a thickness of from about 0.1 to about 3.5 millimeters.

6. The planar anode of claim 1, wherein the ratio of the length of the anode to the thickness of the anode is from about 7 to about 20.

7. The planar anode of claim 1, wherein the anode has a D-shape.

8. The planar anode of claim 1, wherein the powder includes tantalum particles.

9. A wet electrolytic capacitor comprising a cathode, working electrolyte, and the planar anode of claim 1.

10. A method for forming a planar anode for use in a wet electrolytic capacitor, the method comprising:
    pressing a valve metal powder around a leadwire containing only a first portion and a second portion and sintering the pressed powder to form a pellet, wherein the first portion of the leadwire extends outwardly from the pellet in a longitudinal direction and the second portion of the leadwire is embedded within the pellet, wherein the second portion is oriented at an angle of about 40° to about 120° relative to the longitudinal direction, wherein a single bend is formed in the second portion, and wherein the ratio of the length of the second portion of the leadwire to the length of the anode is from about 0.1 to about 0.6; and
    anodically oxidizing the pellet to form a dielectric layer, wherein the anodically oxidized pellet has a thickness of about 5 millimeters or less.

11. The method of claim 10, wherein the angle is from about 80° to about 100°.

12. The method of claim 11, wherein the pellet is anodically oxidized at a formation voltage of from about 150 volts to about 250 volts.

13. The method of claim 10, wherein the leadwire is bent before the valve metal powder is pressed around the leadwire.

14. The method of claim 10, wherein the pressed powder is sintered at a temperature of from about 1300° C. to about 2000° C.

15. The method of claim 10, wherein the anodically oxidized pellet has a thickness of from about 0.1 to about 3.5 millimeters.

16. A wet electrolytic capacitor comprising:
- a planar anode comprising an anodically oxidized pellet formed from a pressed and sintered powder, wherein the anode further comprises a leadwire containing only a first portion and a second portion, wherein the first portion extends outwardly from the pellet in a longitudinal direction and the second portion is embedded within the pellet, wherein the second portion is oriented at an angle of about 40° to about 120° relative to the longitudinal direction such that the second portion contains a single bend, and wherein the ratio of the length of the second portion of the leadwire to the length of the anode is from about 0.1 to about 0.6;
- a cathode that comprises a metal substrate coated with an electrochemically active material; and
- an electrolyte in communication with the anode and the cathode.

17. The wet electrolytic capacitor of claim 16, wherein the angle is from about 80° to about 100°.

18. The wet electrolytic capacitor of claim 16, wherein the length of the second portion of the leadwire is from about 5 to about 15 millimeters and the length of the anode is from about 20 to about 50 millimeters.

19. The wet electrolytic capacitor of claim 16, wherein the planar anode has a thickness of about 5 millimeters or less, and wherein the ratio of the length of the anode to the thickness of the anode is from about 5 to about 50.

20. The wet electrolytic capacitor of claim 16, wherein the anode has a D-shape.

21. The wet electrolytic capacitor of claim 16, wherein the metal substrate includes titanium.

22. The wet electrolytic capacitor of claim 16, wherein the electrochemically-active material includes a conductive polymer.

23. The wet electrolytic capacitor of claim 22, wherein the conductive polymer is a substituted polythiophene.

24. The wet electrolytic capacitor of claim 23, wherein the substituted polythiophene is poly(3,4-ethylenedioxythiophene).

25. The wet electrolytic capacitor of claim 16, wherein the capacitor contains only a single anode.

26. The wet electrolytic capacitor of claim 16, wherein the electrolyte is aqueous and has a pH of from about 4.5 to about 7.0.

27. An implantable medical device comprising the electrolytic capacitor of claim 16.

* * * * *